Patented Aug. 10, 1943

2,326,501

UNITED STATES PATENT OFFICE 2,326,501

ISOCYANATES

Werner Siefken, Cologne, and Arnold Doser, Cologne-Mulheim, Germany, assignors, by mesne assignments, to General Aniline & Film Corporation, New York, N. Y., a corporation of Delaware No Drawing. Application July 28, 1936, Serial No. 93,118. In Germany July 31, 1935

11 Claims. (Cl. 260—453)

The present invention relates to the preparation of isocyanates of the aliphatic series and to the new compositions of matter which are obtainable thereby.

Isocyanates of the aromatic series can be prepared in a simple manner by causing phosgene to react upon salts of aromatic amines; however, this method does not work when applied to amines of the aliphatic series, chlorides of urea derivatives being formed as the chief product of reaction in that case.

One object of our present invention is the determination of the factors which have heretofore made it impossible to prepare isocyanates of the aliphatic series by the reaction of phosgene and salts of aliphatic amines. Another object of our invention is the development of a process by which the formation of urea derivatives is avoided and isocyanates of the aliphatic series are obtained with a good yield and in an economical manner.

With these and other objects in view our invention primarily consists in the feature of working under such conditions that the hydrogen halide formed during the reaction is removed from the reaction mixture. This may be effected for instance by passing an excess of phosgene through the reaction mixture so that the unchanged phosgene entrains the hydrogen halide on leaving the reaction mixture; the phosgene may also be employed in admixture with inert gases such as nitrogen, carbon dioxide, air or hydrogen, the inert gases leaving the reaction mixture likewise entraining the hydrogen halide; another method of effecting the removal of the hydrogen halide consists in working in the presence of such solvents or diluents as dissolve hydrogen halide only with difficulty or not at all, e. g., such as chlorobenzene, dichlorobenzene, toluene or xylene. When the reaction is carried out in the presence of diluents the salts may be directly dissolved or suspended therein, or the desired salt may be produced in the solvent by first dissolving a suitable primary amine and then adding the hydrochloric acid prior to the reaction with phosgene. The salts, which are in most cases insoluble in the diluent, are dissolved during the reaction with phosgene. When the reaction is complete, the isocyanates obtained can be purified, after previous removal of the solvent by vacuum distillation.

It is evident from the preceding paragraph that the reaction can be performed either in the presence or in the absence of solvents, and that the primary aliphatic amines are employed in the form of salts with hydrogen halides. We prefer to work at an elevated temperature of for instance above about 80° C. up to the boiling point of the solvent.

As starting materials we employ all such amines as have the amino group linked to an aliphatic carbon atom. It is evident therefrom that aralkylamines such as benzylamine and cycloaliphatic amines such as those of the naphthene series and also cyclic amines, the ring to which the amino group is linked being hydrogenated, such as hexahydroaniline, tetrahydro-$\alpha$ and $\beta$-naphthylamine are suitable starting materials. Other amines which have proved to be suitable for this reaction are, for instance, primary aliphatic amines of the fatty series such as n-butylamine, isobutylamine, n-hexylamine, dodecylamine, octadecylamine, or oleylamine, furthermore, amines which are obtainable by hydrogenation in the presence of ammonia from natural fats and oils such as train oil, olive oil, palm oil, coconut oil, castor oil, soybean oil, tallow or the like. Among the higher aliphatic amines those containing a straight chain as well as those containing a branched chain can be employed.

The products which are obtainable in accordance with our present invention are valuable intermediate products for the manufacture of dyestuffs, pharmaceutical products and auxiliary agents for the textile industry. Of particular importance are the mixtures of isocyanates of higher alkyls as can be obtained by the reaction of phosgene with mixtures of higher aliphatic amines. Such mixtures of higher aliphatic amines may be prepared, for instance, from natural fats and oils according to the process described in the preceding paragraph or from naphthenic or resin acids or from the products of oxidation of paraffines. The compositions of matter which are obtainable by the reaction of phosgene with mixtures of higher aliphatic amines of the character described are particularly suitable for the preparation of textile assistants.

The following examples illustrate the invention without limiting it thereto, the parts being by weight:

Example 1

In a suitable moisture-proof apparatus a brisk current of dry phosgene is passed at a temperature of 140–150° C. through 260 parts of dry octadecylamine hydrochloride. Even after a short time of reaction the hydrochloride begins to liquefy, hydrogen chloride being split off. By the continued action of the phosgene the solid parts gradually disappear. When about 910 parts of phosgene have been introduced which takes about 14 hours the reaction is stopped and the octadecylisocyanate is obtained in a pure state by vacuum distillation. 227 parts of a pure water-white isocyanate free from chlorine distil off between 190–210° C. under 10 mm. pressure, corresponding to a yield of about 91%.

By causing ammonia to react with the isocyanate the octadecyl urea is formed, which begins to sinter at 98° C. and has a melting point of 101° C.

Example 2

In an apparatus provided with stirrer, reflux condenser and gas inlet tube 830 parts of hydrochloride of technical octadecylamine are introduced into 1500 parts of chlorobenzene and the whole heated to 130–140° C. When the hydrochloride is dissolved a current of phosgene is introduced for a prolonged time whilst stirring. When about 2100 parts of phosgene are consumed which takes about 24 hours, the last traces of hydrogen chloride and phosgene are removed by a current of dry air. After distilling off the chlorobenzene, 780 parts of the isocyanate are obtained in a pure state by vacuum distillation, corresponding to a yield of 97%.

By causing octadecylamine to react upon the isocyanate the N.N'-dioctadecylurea is obtained which has a melting point of 105–160° C.

On replacing octadecylamine hydrochloride by oleylamine hydrochloride, the oleyl-isocyanate is obtained under the same reaction conditions.

Example 3

215 parts of benzylamine in 800 parts of chlorobenzene are treated while stirring with dry gaseous hydrogen chloride until the free base can no longer be detected. The hydrochloride of benzylamine is separated and phosgenated within 20 hours by means of 2200 parts of phosgene at about 130° C. The isocyanate is progressively formed as the hydrochloride is dissolved. By means of an efficient fractionating column the chlorobenzene is separated from the benzyl-isocyanate which distils as a colorless liquid at 82–84° C. and a pressure of 10 mm. The yield is about 220 parts, corresponding to a yield of 83%. The product contains 10.4% nitrogen and is free from chlorine.

By causing aniline to react upon benzyl-isocyanate the N-phenyl-N'-benzylurea is formed, the melting point of which is 167–168° C. in accordance with the literature. The same effect may be attained by replacing the hydrochloride by the hydrobromide.

Example 4

250 parts of a mixture of palm kernel fat amines (boiling point 110–190° C. at 10 mm. pressure) are dissolved in 600 parts of dry xylene. Gaseous hydrogen chloride is passed through the mixture, the hydrochlorides formed in this way remaining dissolved in the xylene owing to the considerable rise of temperature. After passing 1200 parts of phosgene through the mixture for 17 hours while thoroughly stirring at 140–150° C., the solvent is separated from the isocyanates by vacuum distillation at from 130–205° C. under 10 mm. pressure. 270 parts of a clear oily product are obtained which is free from chlorine and shows all the reactions of an isocyanate.

If instead of the mixture of palm kernel fat amines a lorolamine is employed, a mixture of isocyanates of similar properties is obtained.

Example 5

200 parts of cyclohexylamine are diluted by the addition of 400 parts of toluene and transformed into the hydrochloride in a suitable manner by the addition of hydrogen chloride. On the addition of 1820 parts of phosgene at 120–125° C. for 24 hours the hydrochloride gradually dissolves. On separating the toluene in vacuo by means of an effective fractionating column from the cyclohexyl-isocyanate, which distils at 54° C. under a pressure of 11 mm., the yield is 190 parts corresponding to about 76% of theory. By decomposing the isocyanate with water the di(cyclohexyl) urea of the softening point 228° C. is obtained. On the addition of ammonia the cyclohexylurea of melting point 196–197° C. is obtained which has been described by Wallach in Liebigs Annalen der Chemie, vol. 343, p. 46.

Example 6

1 mol=121 parts of $\beta$-phenylethylamine are dissolved in 400 parts of chlorobenzene; the mixture is saturated by the addition of hydrogen chloride and phosgenated by means of 550 parts of phosgene while thoroughly stirring at 140° C. in the course of 6 hours. After working up, 134 parts=91% of theory of pure $\beta$-phenyl-ethyl-isocyanate are obtained, which distils at 98–100° C. under 10 mm. The di($\beta$-phenylethyl)urea obtainable by decomposition with water melts at 138–138.5° C. as described by Curtius and Jordan, Journal für praktische Chemie (2), vol 64, p. 308.

Example 7

520 parts of dry dodecylamino hydrochloride are dissolved at about 140° C. in 1000 parts chlorobenzene. By introducing 1000 parts of phosgene while thoroughly stirring the hydrochloride is transformed into the isocyanate. 465 parts= 94% of theory of dodecylisocyanate are obtained in a pure state boiling at 140°–145° C. under 11 mm.

Example 8

Hydrogen chloride is introduced while stirring into a solution consisting of 2 mol=294 parts of freshly distilled ac. tetrahydro-$\beta$-naphthylamine in 750 parts of chlorobenzene, until the solution is saturated. By the addition of 1150 parts of phosgene the hydrochloride is transformed into the isocyanate in the course of 24 hours at 135–145° C. under a pressure of 10 mm. The yield is 307 parts=about 89% of theory.

Example 9

200 parts of dry n-butylamine hydrochloride are suspended in 400 parts o-dichlorobenzene and phosgenated, whilst thoroughly stirring, in an apparatus provided with an efficient reflux condenser. When the phosgenation is complete dry air is blown through the mixture for some time. A solution of butyl-isocyanate in o-dichlorobenzene is formed which may be used immediately for further reaction. From the solution the butyl-isocyanate may be isolated, for instance by vacuum distillation; it has a boiling point of 114–116° C. under a pressure of 760 mm.

On reacting with ammonia the n-butylurea is obtained which melts at 95–96° C.

A mixture of isocyanates of similar properties is obtained when employing instead of n-butylamine mixtures of higher amines as can be produced from the higher alcohols obtainable as by-products in the synthesis of methyl alcohol.

Example 10

183 parts of ethanol amine are dissolved in 500 parts of 1.2.4-trichlorobenzene and transformed into the hydrochloride by treatment with dry hydrogen chloride. The ethanol amine hydrochloride is then converted into the β-chloroethylamino hydrochloride by the addition of 400 parts of pure thionyl chloride while gradually raising the temperature up to 140° C. Into the suspension of this product there is introduced for 7 hours while thoroughly stirring a current of phosgene (about 125 parts per hour), thereby the crystals of the hydrochloride being gradually removed. Thus a solution of the β-chloroethylisocyanate is formed which may be obtained in a pure state by vacuum distillation and which has a boiling point from 38–39° C. at 11 mm. pressure.

Example 11

185 parts of dodecylamine are dissolved in 400 parts of toluene and transformed by the action of dry hydrogen chloride into the hydrochloride which still remains in solution when raising the temperature up to about 100° C. Over this solution there is passed at 110–120° C. for 18 hours while thoroughly stirring an inert dry gas such as air or carbon dioxide together with 240 parts of phosgene. There may be obtained from the mixture by vacuum distillation about 203 parts of pure dodecylisocyanate which has a boiling point of 135–140° C. at 11 mm. pressure.

Example 12

48 parts of a mixture of naphthenamines which boil between 88° C. and 156° C. at 11 mm. pressure are dissolved in 100 parts of chlorobenzene. The mixture is saturated with dry hydrogen chloride and then phosgenated with 270 parts of phosgene for 4 hours while stirring. On distilling off the diluent 40 parts of a mixture of the naphthene isocyanates are obtained which boil between 95 and 160° C. under a pressure of 11 mm.

Example 13

80 parts of a mixture of amines obtained by the hydrogenation in the presence of ammonia of the mixture of acids obtainable by oxidation of paraffins are dissolved in 100 parts of toluene and transformed into the hydrochlorides by the introduction of gaseous hydrogen chloride; thereupon the mixture is phosgenated by the introduction of 800 parts of phosgene for 15 hours at 120–130° C. On removing the toluene in vacuo 87 parts of a mixture of isocyanates are obtained which boils between 48 and 170° C. under a pressure of 11 mm.

Example 14

275 parts of a mixture of amines obtained by hydrogenation in the presence of ammonia from train fat acids boiling between 140 and 220° C. at 12 mm. pressure are dissolved in 300 parts of chlorobenzene and treated at 130–140° C. for 17 hours while thoroughly stirring with 830 parts of phosgene. On distilling off the chlorobenzene, an isocyanate mixture is obtained in a very good yield which boils between 165 and 215° C. at 11 mm. pressure.

We claim:

1. The process which comprises causing phosgene to react upon hydrogen halides of primary monoamines selected from the class consisting of alkyl, aralkyl, cycloalkyl and hydroaryl amines while continuously removing from the reaction mixture the hydrogen halides formed during the reaction.

2. The process which comprises causing phosgene to react upon hydrogen halides of primary mono amines selected from the class consisting of alkyl, aralkyl, cycloalkyl and hydroarylamines, the phosgene being introduced in such a rate as to remove the hydrogen halides from the reaction mixture.

3. The process according to claim 1 which comprises causing phosgene to react upon hydrogen halides of primary mono amines selected from the class consisting of alkyl, aralkyl, cycloalkyl and hydroarylamines, the reaction being performed in such liquids as are inert to the reaction components and are at the most poor solvents for hydrogen halides.

4. The process which comprises causing phosgene to react, in the presence of inert gases, upon hydrogen halides of primary monoamines selected from the class consisting of alkyl, aralkyl, cycloalkyl, and hydroarylamines, while causing the phosgene and the inert gases to pass through the reaction mixture at such a rate that the inert gases entrain and remove from the zone of the reaction, the hydrogen halides liberated during the reaction.

5. The mixture of higher cyclo-alkyl isocyanates produced by the process which comprises causing phosgene to react upon the hydrogen halides of a mixture of higher cyclo-alkyl primary monoamines wherein the cyclo-alkyl radicals are secured from the class consisting of natural naphthenic and resin acids, while continuously removing from the reaction mixture the hydrogen halides formed in the reaction.

6. The mixture of higher alkyl isocyanates produced by the process which comprises causing phosgene to react upon the hydrogen halides of a mixture of higher alkyl primary monoamines wherein the alkyl radicals are secured from the acids obtained by the oxidation of paraffins while continuously removing from the reaction mixture the hydrogen halides formed in the reaction.

7. The process which comprises causing phosgene to react upon the hydrogen halide of dodecylamine in the presence of toluene.

8. The process which comprises causing phosgene to react upon the hydrogen halide of a higher alkyl primary monamine in the presence of an inert solvent.

9. The process which comprises causing phosgene to react upon the hydrogen halide of a higher alkyl primary monoamine having at least 12 C. atoms in the aliphatic carbon chain in the presence of an inert solvent selected from the group consisting of chlorobenzene and toluene.

10. The process which comprises causing phosgene to react upon the hydrogen halide of a mixture of higher alkyl primary monoamines wherein the alkyl radical is secured from the natural fats and oils, in the presence of an inert solvent selected from the group consisting of chlorobenzene and toluene.

11. The mixture of higher alkyl isocyanates produced by the process which comprises causing phosgene to react upon the hydrogen halide of a mixture of higher alkyl primary monoamines, wherein the alkyl radical is secured from the natural fats and oils, in the presence of an inert solvent selected from the group consisting of chlorobenzene and toluene.

WERNER SIEFKEN.
ARNOLD DOSER.

Certificate of Correction

Patent No. 2,326,501. August 10, 1943.

WERNER SIEFKEN ET AL.

It is hereby certified that error appears in the printed specification of the above numbered patent requiring correction as follows: Page 2, first column, line 33, Example 2, for the numeral "160" read *106*; and that the said Letters Patent should be read with this correction therein that the same may conform to the record of the case in the Patent Office.

Signed and sealed this 22nd day of April, A. D. 1947.

[SEAL]

LESLIE FRAZER,
*First Assistant Commissioner of Patents.*